UNITED STATES PATENT OFFICE.

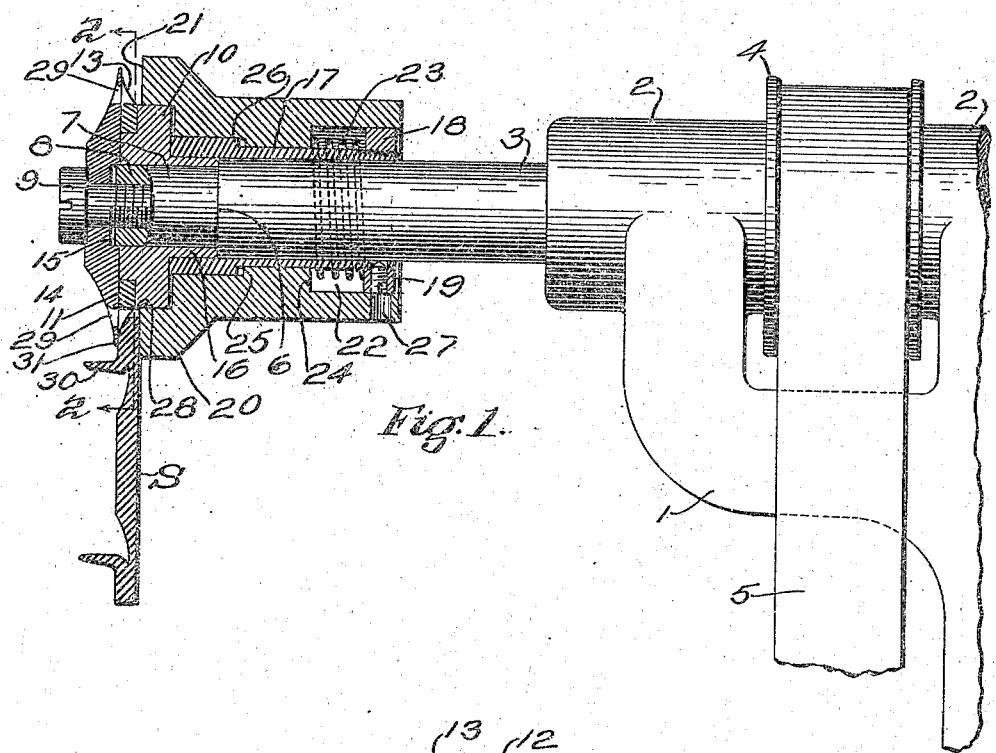
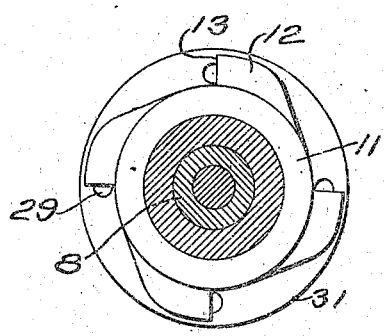
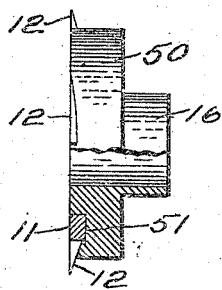
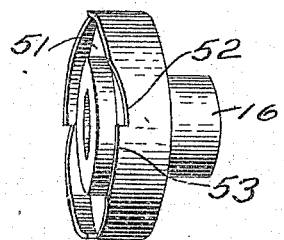

WILLIAM H. HOOPER, OF LYNN, MASSACHUSETTS, ASSIGNOR TO THOMAS G. PLANT, OF BOSTON, MASSACHUSETTS.

INSOLE-EDGE TRIMMER.

957,960.  Specification of Letters Patent.  Patented May 17, 1910.

Application filed May 5, 1909. Serial No. 494,117.

*To all whom it may concern:*

Be it known that I, WILLIAM H. HOOPER, a citizen of the United States, residing at Lynn, in the county of Essex and State of Massachusetts, have invented an Improvement in Insole-Edge Trimmers, of which the following description, in connection with the accompanying drawings, is a specification, like characters on the drawings representing like parts.

The invention to be hereinafter described relates to edge trimmers for the soles of boots and shoes.

The object of the invention is to provide a machine whereby the edge portions of shoe soles, and more particularly though not necessarily insoles, may be readily and quickly trimmed, which will best be made clear from the following description and accompanying drawings of one form of the invention.

In the drawings:—Figure 1 is a side elevation with parts shown in section of a machine embodying the present invention; and Fig. 2 is a section on line 2—2, Fig. 1. Fig. 3 is a perspective view of a modified form of bearing collar detached. Fig. 4 is a detached detail showing the relation of the knives and modified form of bearing collar.

Having reference to Fig. 1, 1 represents a suitable supporting element for bearings 2 which sustain a shaft 3 driven by a pulley 4 and belt 5 from any suitable or convenient source of power. The shaft 3 near its end portion is provided with a shoulder 6, the reduced end portion 7 of said shaft being provided with an internal screw thread 8 to receive the complemental threads on the screw bolt 9 which, as will hereinafter appear, serve as one means for securing the knives to the shaft 3 to cause rotation thereof. Surrounding the reduced portion 7 of the shaft 3 is a bearing collar 10 having at its front face a seat for the knife carrier 11 which, as indicated in Fig. 2, is preferably formed as a ring having a series of knives 12 projecting therefrom, the cutting edge 13 of each knife 12 serving to trim the insole in the manner that will presently appear. The knife carrier 11, thus seated in the bearing collar 10, is held in fixed relation thereto by means of a clamping guard 14 which is preferably formed circular or in disk shape and having a central aperture through which the screw bolt 9 passes. The face of the clamping guard 14 adjacent the end of the reduced portion 7 of the shaft is preferably provided with a socket portion 15 adapted to receive the end of the shaft when the clamping face of the clamping guard 14 is forced against the knife carrier 11, as will be readily understood, the construction being such that upon setting up the screw bolt 9 the clamping guard 14 is forced against the knife carrier 11 or other knife carrying means and securely clamps the knives between the clamping guard 14 and the bearing collar 10 which rotate with the shaft 3. The bearing collar 10 has a reduced portion 16 preferably of the same diameter as the shaft 3, and surrounding said reduced portion 16 and the main portion of the shaft 3 is a sleeve 17 which has a collar 18 screw-threaded on the end thereof remote from the knives, as clearly indicated in Fig. 1. The sleeve 17 is secured to the shaft so as to be incapable of longitudinal movement thereon by means of a set screw 19 or other suitable means. Loosely surrounding the sleeves 17 is a work holder 20 having a bearing face 21 adapted to contact with one face of the work or sole S, as indicated in Fig. 1. The outside portion of the work holder 20 is provided with a recess 22 which receives a spring 23, one end of which is seated against the collar 18 and the other against the forward wall 24 of the recess 22, the construction being such that the spring 23 normally holds the work holder pressed to the left, Fig. 1, toward the knives 12.

Since the knives revolve with the shaft 3 and the work holder 20 is loosely connected with said shaft in a manner substantially as described, so that there may be at times relative rotative movement between the work holder and the knives, it is desirable that means be provided to prevent the spring 23 from forcing the face 21 of the work holder into contact with the rotating knives and to this end the work holder 20 is provided with a shoulder 25 which, when the work holder is pressed its maximum extent toward the knives 12 by the spring 23, contacts with a co-acting shoulder 26 on the sleeve 17, which, being prevented from longitudinal movement on the shaft 3, limits the movement of the work holder toward the knives, as will be readily understood.

In order that the collar 18 may be contained within the recess 22 of the work holder and yet be held in place by a simple form of clamping screw 19, the work holder is provided with an aperture 27 for a screw driver or other implement by which the clamping screw 19 may be set up.

As well known by those skilled in the art, it is desirable that the channeled surface of the insole outside the channel lip shall be trimmed so as to reduce the thickness of the stock along said edge; and it is likewise desirable that the trimming action of the knives may at times extend varying distances from the edge of the insole. For instance, in some classes of work it is desirable to trim the shank portion of the insole for a greater distance inward or from the edge than around the forepart, and it is sometimes desirable also that this trimming action shall be formed as a bevel, though obviously it might be a straight cut. Regardless of the character of the trimming cut, however, it is of importance that the operator be prevented from forcing the insole so far inward with relation to the knives as to cause the latter to cut or injure the channel lip. With these facts in mind the present invention contemplates providing the bearing collar 10 with an exterior bearing surface 28 against which the edge of the insole S may contact when the insole is forced its maximum distance toward the shaft 3, the disposition of the parts being such that when the insole has its edge bearing on the surface 28, the knives 12 act upon the surface of the sole their maximum distance from the edge thereof, but yet do not extend into the zone of the channel lip. The knives 12 have their cutting edges 13 preferably inclined to the axis of rotation of the knives, the construction being such that the cut formed by said edges will be a rounded or beveled one, substantially as indicated on the sole S, Fig. 1, though of course the invention in its broader aspect is not circumscribed by this detail, since the knives might be made with straight cutting edges.

Since the knives cut the stock from the insole between the clamping guard 14 and the work holder 20, provision has been made for permitting the escape of chips and pieces of stock cut off by the knives, said means in the present embodiment of the invention comprising a series of holes 29 formed in the clamping guard 14 adjacent the cutting edge of each of the knives 12, the construction being such that as the knives remove the material from the surface of the insole, the chips and other waste will readily pass through the clamping guard and escape.

From the construction described it will be noted that when the edge of an insole S is to be trimmed, the said edge is forced between the work holder 20 and the clamping guard 14, the work holder yielding as the edge of the insole is forced to place. The degree of pressure upon the insole will determine the extent of the cut made by the knives from the edge toward the channel lip 30, so that when trimming around the forepart, if desired, the operator may take off only a small portion around the edge, and when trimming around the shank he may, by simply increasing his pressure against the insole, force it inward as far as the surface 28 of the bearing collar, and thus increase the extent of the cut from the edge toward the channel lip. The work holder 20, being spring pressed toward the knives 12 and longitudinally of the shaft 3 by the spring 23 or other suitable yielding means, readily permits the introduction of the work and maintains the work in operative relation with the knives during the trimming action.

It will be noted that the clamping guard 14 not only serves to hold the knives in place, but extends over and slightly beyond the periphery of the knives so that danger of accidental cutting either of the operators or the stop is thereby avoided and a gage is afforded by the circular edge 31 of the clamping guard to guide the operator in determining the extent he shall force the edge of the insole inward to the action of the knives.

While the details hereinbefore described present a good practical form of the present invention, it is to be understood that in its true scope the invention is not circumscribed by these details and that it may be varied in form, disposition of parts and other general variation without departing from the spirit of the present invention which is definitely set forth by the claims.

Figs. 3 and 4 show a modified form of bearing collar 50 wherein the front face of the collar is provided with a recess 51 to receive the carrier or ring portion 11 of the cutters 12. The bearing collar 50 in the modified form disclosed is provided with recesses 52 through which the knives may project, the portions 53 extending between the knives and covering the knife carrier or ring portion 11 so that the edge of the sole cannot contact with the knife carrier.

Claims—

1. In an insole edge trimmer, the combination of a shaft and its operating means, a bearing collar on said shaft having a seat for a knife carrier and a bearing shoulder to limit the inward movement of the sole edge, a knife carrier comprising a ring portion to engage the seat in the bearing collar and carrying knives, a clamping guard covering the face of said knife carrier and knives, means for clamping the knife carrier and knives between said bearing collar and clamping guard to force and hold the ring portion of the knife carrier in its seat and cause it to rotate with the bearing collar, a work holder surrounding said shaft, and means for yieldingly forcing said work holder longitudinally of said shaft and toward the said knives.

2. In an insole edge trimmer, the combination of a shaft and its operating means, said shaft having a reduced end bearing portion 7, a bearing collar on said reduced portion of said shaft, and having a seat for a knife carrier, a knife carrier carrying knives and seated on said collar, a clamping guard covering the face of said knife carrier and knives, means for forcing the clamping guard longitudinally of the shaft to clamp the bearing collar on the reduced portion of the shaft and the knife carrier in the seat of the clamping collar and cause said parts to rotate with said shaft, a work holder surrounding said shaft, means for yieldingly forcing said work holder longitudinally of said shaft and toward the said knives, said bearing collar having a stop shoulder becoming exposed for contact with the edge of the sole as the work holder is moved back by the work, and means for limiting the movement of the work holder in response to said yielding means.

3. In an insole edge trimmer, the combination of a shaft having a reduced end bearing portion 7 and shoulder 6, a bearing collar 10 loosely mounted on said reduced portion 7 and having a reduced portion 16 the end of which bears against said shoulder 6 and an enlarged portion provided with a seat for a knife carrier, a knife carrier 11 having a circular portion to engage said seat and provided with knives, a clamping guard 14, and means for forcing the clamping guard longitudinally relative to the shaft for clamping the knife carrier to its seat and the bearing collar 10 against the said shoulder 6 of the shaft.

4. In an insole edge trimmer, the combination of a shaft having a reduced end bearing portion 7 and shoulder 6, a bearing collar 10 loosely mounted on said reduced portion 7 and having a reduced portion 16 the end of which bears against said shoulder 6 and an enlarged circular bearing portion 28 to contact with the sole edge, said circular bearing portion having a face seat, a knife carrier 11 having a circular portion to engage said seat and provided with knives, a clamping guard, means to force the clamping guard longitudinally of the shaft to clamp the knife carrier to the bearing collar and the bearing collar to the shaft, and a work holder movable longitudinally of the shaft.

In testimony whereof, I have signed my name to this specification, in the presence of two subscribing witnesses.

WILLIAM H. HOOPER.

Witnesses:
    REDFIELD H. ALLEN,
    ROSWELL F. HATCH.